Dec. 11, 1956  W. W. SLAGHT  2,773,366
SEALED UNIVERSAL COUPLING TRUNNION BEARINGS
Filed Dec. 31, 1952
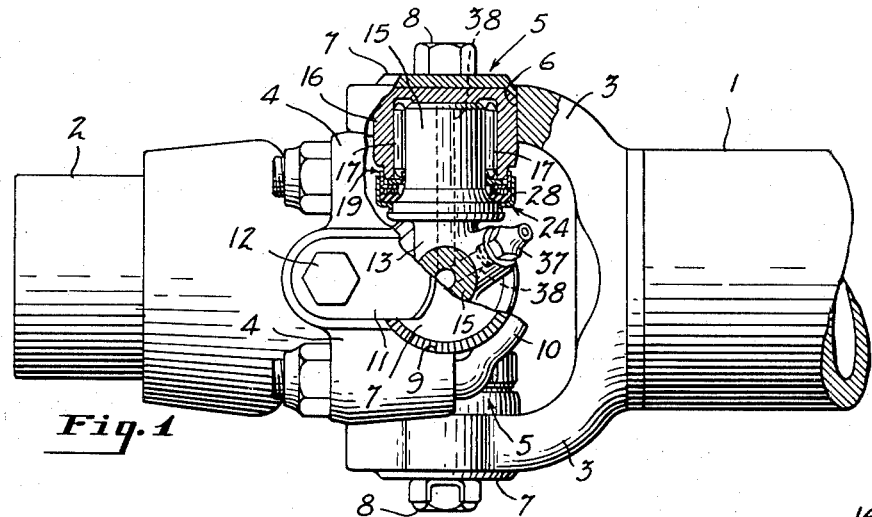
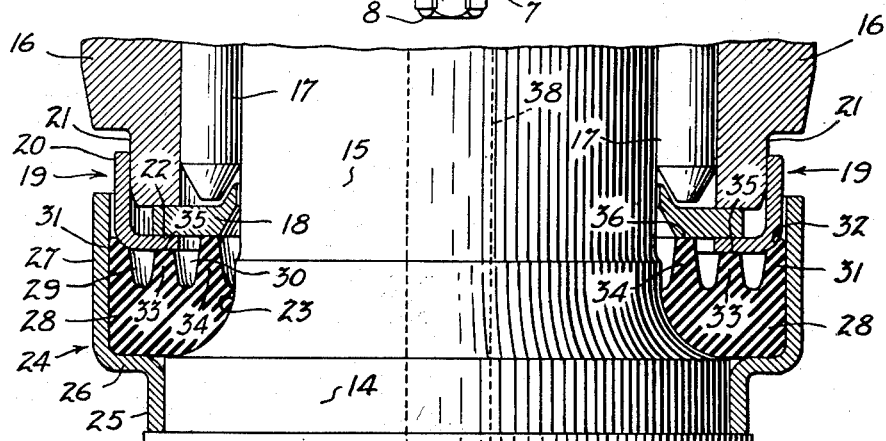
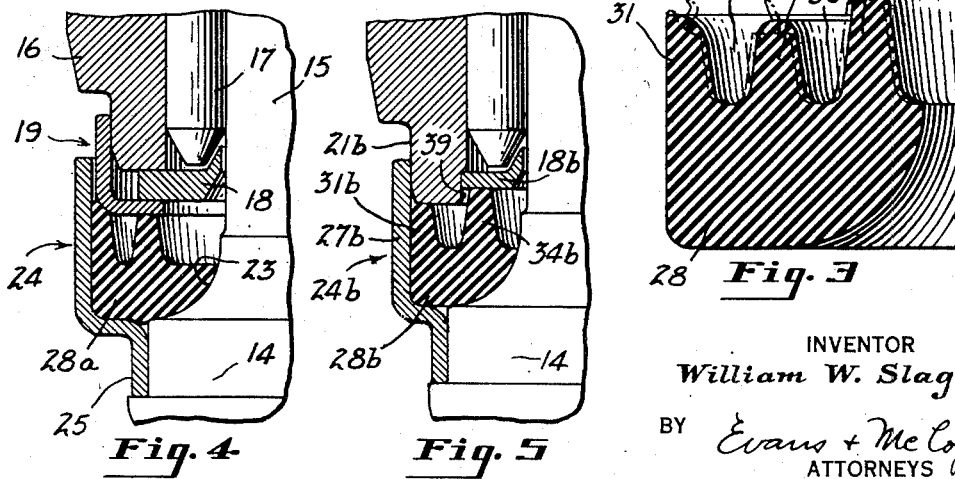
INVENTOR
William W. Slaght
BY Evans + McCoy
ATTORNEYS

United States Patent Office 2,773,366
Patented Dec. 11, 1956

2,773,366

SEALED UNIVERSAL COUPLING TRUNNION BEARINGS

William W. Slaght, Rocky River, Ohio, assignor to Cleveland Steel Products Corporation, Cleveland, Ohio, a corporation of Ohio Application December 31, 1952, Serial No. 328,974

12 Claims. (Cl. 64—17)

This invention relates to universal couplings of the cross and yoke type commonly used in motor vehicle transmissions and particularly to the sealing of the trunnion bearings of such couplings.

In universal couplings of the type referred to the trunnions carried by the cross are commonly journaled in cup bearings and packing rings are provided at the inner ends of the cup bearings that have sliding engagement with the inner ends of the cup bearings. When such couplings are subjected for extended periods to the action of muddy water, abrasive material enters between the bearing cups and packing rings and wears away the packing. Entry of water and abrasive material to the roller bearings past the worn packing soon results in failure of the coupling. Such couplings are commonly provided with grease gun fittings by means of which lubricant under pressure can be forced into the cup bearings and when the sealing rings are not too tightly clamped they will permit flushing of the bearing with lubricant and the destructive action of abrasive materials on the bearing may be reduced by frequent flushing of the bearing.

The present invention provides a sealing ring of elastic material such as rubber, that is provided with one or more relatively deep annular channels or recesses in the face thereof that engages with the cup bearing, which are filled with lubricant when lubricant is injected into the bearing and which retain lubricant against the end bearing face of the cup bearing, so that the lubricant trapped in the channels is pressed outwardly by centrifugal force during rotation of the coupling and provides a film of lubricant between the relatively slidable engaging portions of the cup bearing and sealing ring that resists flow of fluid material into the bearing. The sealing ring is confined within a rigid channel on the trunnion arm of the cross and between the inner end of the cup bearing and the bottom of the channel and the engaging face of the sealing ring is composed of flexible elements past which lubricant under pressure may be forced without damaging or displacing the sealing ring and without impairing its sealing qualities.

Objects of the invention are to provide each of the trunnion bearings of a coupling of the cross and yoke type with a seal that is capable of excluding water and abrasive materials from the trunnion bearings for an extended period of time under the most severe operating conditions and to provide a seal that can be easily assembled, that is simple in construction and that will permit the bearing to be flushed without impairing the effectiveness of the seal.

Reference should be had to the accompanying drawings forming a part of this specification in which:

Figure 1 is a side elevation of a universal coupling embodying the invention, with a portion broken away to show a portion of the cross and one of the sealed bearings;

Fig. 2 is a fragmentary section on an enlarged scale taken transversely through one of the bearing seals;

Fig. 3 is a radial cross section of the sealing ring on an enlarged scale;

Fig. 4 is a sectional view showing a slightly modified seal; and

Fig. 5 is a sectional view showing an additional modification.

In the accompanying drawings the invention is shown applied to a universal coupling that comprises a pair of yokes 1 and 2 each provided with opposed arms positioned on opposite sides of its axis of rotation, the arm 1 having spaced arms 3 and the yoke 2 having spaced arms 4. The arms 3 and 4 provide supports for cup bearings 5 that are non-rotatably mounted in the arms with their inner open ends facing the axis of rotation. The arms 3 are provided with axially alined openings 6 in which a pair of cup bearings 5 are mounted, the cup bearings being held in place and against rotation by clamping plates 7 that are pressed against the outer closed ends of the bearing cups 5 by means of bolts 8. The arms 4 of the yoke 2 have transversely alined recesses 9 in which a pair of axially alined cup bearings 5 are clamped by means of U-bolts 10. The arms 4 also carry clamping plates 11 that are secured thereto by bolts 12 and that bear against the outer closed ends of the cup bearings. The two yokes are connected by means of a cross 13 provided with four equiangularly spaced arms 14 that have trunnions 15 formed thereon at their outer ends. The two pairs of axially alined trunnions carried by the cross 13 are journaled in the cup bearings 5 carried by the yoke arms 3 and 4.

The cup bearing 5 has a cup-shaped body portion 16 which is of an internal diameter enough greater than the diameter of the trunnion 15 to accommodate bearing rollers 17 that are held in place by means of a supporting ring 18 at the inner end of the cup bearing. The supporting ring 18 is held in place by means of a retaining ring 19 that has a circular flange 20 that has a press fit on the inner end portion 21 of the body portion 16 of the cup bearing which is of reduced diameter, the ring 19 having an inwardly extending retaining flange 22 that overlies the supporting ring 18 and secures the same to the inner end of the body 16. The rings 18 and 19 are preferably sheet metal stampings that have smooth external surfaces that provide annular bearing faces at the inner end of the cup bearing.

The trunnion arm 14 is provided with a rounded concave shoulder 23 adjacent the inner end of the trunnion 15 and a seal retaining ring 24 has an inner end portion 25 of reduced diameter that fits on the arm 14 inwardly of the shoulder 23. The seal retaining ring 24 forms with the arm of the cross an outwardly facing channel that receives the inner end of the cup bearing. The ring 24 has a shoulder portion 26 that is alined with the outer edge of the shoulder 23 to form therewith the bottom of the channel. Outwardly of the shoulder portion 26 the retaining ring 24 has an outwardly projecting circular flange 27 that projects past the inner end of the cup bearing and overlies the flange 20 of the retaining ring 19 with a small clearance. The annular channel formed around the arm 14 by means of the retaining ring 24 receives an elastic rubber sealing ring 28 that fits in the annular channel formed by the arm 14 and ring 24. The depth of the ring 28 is less than the height of the flange 27 and the outer bearing face of the sealing ring engages with the bearing surfaces on exterior faces of the rings 18 and 19 a substantial distance inwardly from the open outer end of the receiving channel. The outer bearing face of the sealing ring is provided with concentric annular lubricant retaining channels 29 and 30 that are closed by the bearing faces of the cup bearing 5.

Outwardly of the outer annular channel 29 an outer flexible annular rib 31 is provided that engages the interior of the flange 27 and that has a tapering edge 32 that is under compression between the flange 27 of the seal retaining ring and the rounded corner of the retaining ring 19. Intermediate the channels 29 and 30 the sealing ring has an intermediate flexible rib 33 and inwardly of the channel 30 the ring 28 has a third flexible annular rib 34. The sealing ring 28 is under compression between the cup bearing 5 and the shoulders 23 and 26 and the ribs 33 and 34, which are preferably molded with rounded edges, have narrow annular edge faces 35 and 36 that bear against the external faces of the rings 18 and 19.

The cup bearings are held against rotation in the yoke arms and may be adjusted to vary the pressure on the sealing rings 28 by means of the clamping plates 7 and 11 and bolts 8 and 12. Since the ribbed faces of the sealing rings 28 are yieldable, the pressure on the sealing ring is more gradually increased or decreased by adjustment of the cup bearings and there is less danger of excessive wear on the sealing ring. During rotation of the coupling the trunnions 15 oscillate in the bearing cups and the inner ends of the cup bearings slide on the sealing rings 28 during such oscillation.

In order to supply lubricant under pressure to the trunnion bearings, the cross 13 is preferably provided with a grease gun fitting 37 and passages 38 leading from the fitting to the outer ends of the trunnions to deliver lubricant under pressure into the cup bearings.

The sealing ring of the present invention, which is mounted entirely within a retaining channel on the cross and which is provided with flexible bearing portions on its outer face, will permit the bearing to be flushed with lubricant under high pressure to replace the lubricant in the bearing with fresh lubricant when desired. Also the annular concentric recesses in the sealing ring will retain a substantial volume of lubricant which during rotation of the coupling is forced outwardly against the inner end of the coupling by centrifugal force to maintain a film of lubricant between the bearing surfaces on the cup bearing and the edge faces of the ribs which serves to minimize wear on the sealing ring and also tends to maintain a lubricant flow in a direction to exclude fluent material such as water or dust from the seal.

In some instances a single lubricant retaining channel with narrow annular bearing faces on opposite sides of the channel may be sufficient. In Fig. 4 of the drawings a seal is shown which has a single lubricant retaining channel, this seal being identical with that above described, except that the sealing ring 28a has no inner rib engaging with the roller supporting rim 18.

In Fig. 5 of the drawings a modified construction is shown in which the roller retaining ring 18b has a press fit in a counterbore 39 formed in the inner end of the cup body 16. A seal retaining ring 24b corresponds to the seal retaining ring 24 except that the outer end of its flange 27b fits upon and has bearing engagement with the inner reduced end 21b of the cup body.

A sealing ring 28b has an outer rib 31b that engages the interior of the flange 27b and that bears against the end face of the bearing cup. The ring 28b has an inner rib 34b that is spaced inwardly from the rib 31b to provide a lubricant retaining channel 29b and that bears against the inner face of the roller retaining ring 18b.

In each of the modifications described the inner annular bearing rib of the sealing ring is spaced outwardly from the exterior of the trunnion to provide a lubricant receiving space between the ring and trunnion and when the lubricant is subjected to pressure the flexible bearing ribs are displaced from the surfaces against which they bear sufficiently to permit flow of lubricant past the bearing edges of the flexible ribs to the exterior of the bearing.

It will be noted that the external diameter of the seal retaining ring is less than the external diameter of the cup body and that a recess is provided between the shoulder at the outer end of the reduced portion 21 of the cup body and the outer edge of the retaining and bearing rings. It has been found that when the bearing is incased in mud the mud tends to collect and solidify in this external recess, forming a dam which impedes the flow of fluent material toward the bearing seal.

It is to be understood that in accordance with the provisions of the patent statutes, variations and modifications of the specific devices herein shown and described may be made without departing from the spirit of the invention.

What I claim is:

1. In a universal coupling having a yoke provided with an arm spaced laterally from the axis of rotation of the coupling and a cross having a trunnion journaled in said arm, the combination therewith of a sealed bearing for said trunnion comprising a cup bearing attached to said yoke and receiving said trunnion, means on said cross forming an annular channel concentric with said trunnion and receiving the inner end of said cup bearing, and an elastic and flexible sealing ring fitting in said channel and confined between the inner end of said cup bearing and the bottom of said channel, said sealing ring having inner and outer spaced annular bearing portions in sliding contact with said cup bearing and an annular channel between said bearing portions for retaining a body of lubricant so positioned that the lubricant will be pressed by centrifugal force against said cup bearing between said bearing portions during rotation of the coupling.

2. In a universal coupling having a yoke provided with an arm spaced laterally from the axis of rotation of the coupling and a cross having a trunnion journaled in said arm, the combination therewith of a sealed bearing for said trunnion comprising a cup bearing attached to said yoke and receiving said trunnion, means on said cross forming an annular channel concentric with said trunnion and receiving the inner end of said cup bearing, said channel forming means including a retaining ring that forms the outer wall of the channel and that projects outwardly past the inner end of said cup bearing, and an elastic and flexible sealing ring fitting in said channel and confined between the inner end of said cup bearing and the bottom of said channel, said sealing ring having an outer annular rib adjacent the interior of said retaining ring and a second annular rib radially inwardly of said outer rib, said ribs providing an annular lubricant retaining channel between them and having their edges in sliding contact with said cup bearing.

3. In a universal coupling having a yoke provided with an arm spaced laterally from the axis of rotation of the coupling and a cross having a trunnion journaled in said arm and provided with a passage through the trunnion for lubricant under pressure, the combination therewith of a sealed bearing for said trunnion comprising a cup bearing attached to said yoke and receiving said trunnion, said cup bearing having a continuous annular bearing face on its inner end, means on the cross forming an anular channel concentric with said trunnion and receiving the inner end of said cup bearing, and an elastic and flexible sealing ring confined within said channel and between the inner end of said cup bearing and the bottom of said channel, said sealing ring having an outer face that is provided with an annular lubricant retaining channel, said outer face having continuous annular bearing portions on opposite sides of said channel that have sliding contact with said annular bearing face on the inner end of said cup bearing.

4. In a universal coupling having a yoke provided with an arm spaced laterally from the axis of rotation of the coupling and a cross having a trunnion journaled in said arm, the combination therewith of a sealed bearing for said trunnion comprising a cup bearing attached to said yoke and receiving said trunnion, means on said cross forming an annular channel concentric with said trunnion and receiving the inner end of said cup bearing, said channel forming means including a retaining ring that forms the outer wall of said channel and that projects outwardly past the inner end of said cup bearing in close proximity to the periphery thereof, and an elastic and flexible sealing ring fitting in said channel and confined between the inner end of said cup and the bottom of said channel, said sealing ring having an outer face that engages the inner end of said cup bearing and that has an annular lubricant retaining channel opening outwardly to its outer face inwardly of said retaining ring and continuous annular bearing portions in sliding contact with the inner end of said cup radially inwardly and outwardly of said channel.

5. In a universal coupling having a yoke provided with an arm spaced laterally from the axis of rotation of the coupling and a cross having a trunnion journaled in said arm, the combination therewith of a sealed bearing for said trunnion comprising a cup bearing attached to said yoke and receiving said trunnion, means on said cross forming an annular channel concentric with said trunnion and receiving the inner end of said cup bearing, said channel forming means including a retaining ring that forms the outer wall of said channel and that projects outwardly past the inner end of said cup bearing in close proximity to the periphery thereof, and an elastic and flexible sealing ring fitting in said channel and confined between the inner end of said cup and the bottom of said channel, said sealing ring having an outer face that engages the inner end of said cup bearing and that has concentric annular lubricant retaining channels in said outer face.

6. In a universal coupling having a yoke provided with an arm spaced laterally from the axis of rotation of the coupling and a cross having a trunnion journaled in said arm, the combination therewith of a sealed bearing for said trunnion comprising a cup bearing attached to said yoke and receiving said trunnion, means on said cross forming an annular channel concentric with said trunnion and receiving the inner end of said cup bearing, said channel forming means including a retaining ring that forms the outer wall of said channel and that has an interior bearing face engaging the periphery of said cup bearing, and an elastic and flexible sealing ring fitting in said channel and confined between said cup bearing and the bottom of said channel, said sealing ring having concentric annular bearing portions in sliding contact with the inner end of said cup bearing and an annular channel between the bearing portions for retaining lubricant.

7. In a universal coupling having a yoke provided with an arm spaced laterally from the axis of rotation of the coupling and a cross having a trunnion journaled in said arm and provided with a passage through the trunnion for lubricant under pressure, the combination therewith of a sealed bearing for said trunnion comprising a cup bearing attached to said yoke and receiving said trunnion, said cup bearing having a continuous annular bearing face on its inner end, means on the cross forming an annular channel concentric with said trunnion and receiving the inner end of said cup bearing, and an elastic and flexible sealing ring confined within said channel and between the inner end of said cup bearing and the bottom of said channel, said sealing ring having an outer face that is provided with an annular lubricant retaining channel, said outer face having continuous annular bearing portions on opposite sides of said channel that have sliding contact with said annular bearing face on the inner end of said cup bearing, said sealing ring having radially spaced, concentric, flexible, annular ribs on its outer face that define said lubricant retaining channel therebetween and that provide said continuous annular bearing portions on opposite sides of said lubricant retaining channel.

8. In a universal coupling having a yoke provided with an arm spaced laterally from the axis of rotation of the coupling and a cross having a trunnion journaled in said arm, the combination therewith of a sealed bearing for said trunnion comprising a cup bearing attached to said yoke and receiving said trunnion, means on said cross forming an annular channel concentric with said trunnion and receiving the inner end of said cup bearing, said channel forming means including a retaining ring that forms the outer wall of said channel and that projects outwardly past the inner end of said cup bearing in close proximity to the periphery thereof, and an elastic and flexible sealing ring fitting in said channel and confined between the inner end of said cup and the bottom of said channel, said sealing ring having an outer face that engages the inner end of said cup bearing and that has an annular lubricant retaining channel opening outwardly to its outer face inwardly of said retaining ring and continuous annular bearing portions in sliding contact with the inner end of said cup radially inwardly and outwardly of said channel, said sealing ring having radially spaced, concentric, flexible, annular ribs on its outer face that define said lubricant retaining channel therebetween and that provide said continuous annular bearing portions radially inwardly and outwardly of said channel.

9. In a universal coupling having a yoke provided with an arm spaced laterally from the axis of rotation of the coupling and a cross having a trunion journaled in said arm, the combination therewith of a sealed bearing for said trunnion comprising a cup bearing attached to said yoke and receiving said trunnion, means on said cross forming an annular channel concentric with said trunnion and receiving the inner end of said cup bearing, said channel forming means including a retaining ring that forms the outer wall of said channel and that projects outwardly past the inner end of said cup bearing in close proximity to the periphery thereof, and an elastic and flexible sealing ring fitting in said channel and confined between the inner end of said cup and the bottom of said channel, said sealing ring having an outer face that engages the inner end of said cup bearing and that has concentric annular lubricant retaining channels in said outer face, said sealing ring having radially spaced, concentric, flexible, annular ribs on its outer face that define said lubricant retaining channels therebetween, at least one of said ribs engaging the inner end of said cup bearing.

10. In a universal coupling having a yoke provided with an arm spaced laterally from the axis of rotation of the coupling and a cross having a trunnion journaled in said arm, the combination therewith of a sealed bearing for said trunnion comprising a cup bearing attached to said yoke and receiving said trunnion, means on said cross forming an annular channel concentric with said trunnion and receiving the inner end of said cup bearing, said channel forming means including a retaining ring that forms the outer wall of said channel and that has an interior bearing face engaging the periphery of said cup bearing, and an elastic and flexible sealing ring fitting in said channel and confined between said cup bearing and the bottom of said channel, said sealing ring having concentric annular bearing portions in sliding contact with the inner end of said cup bearing and an annular channel between the bearing portions for retaining lubricant, said sealing ring having radially spaced, concentric, flexible, annular ribs on its outer face that provide said bearing portions and define the lubricant retaining channel therebetween.

11. In a universal coupling having a yoke provided with an arm spaced laterally from the axis of rotation of the coupling and a cross having a trunnion journaled in said arm, the combination therewith of a sealed bearing for said trunnion comprising a cup bearing attached to said yoke and receiving said trunnion, means on said cross forming an annular channel concentric with said trunnion and receiving the inner end of said cup bearing, said channel forming means including a retaining ring that forms the outer wall of said channel and that has an interior bearing face engaging the periphery of said cup bearing, and an elastic and flexible sealing ring fitting in said channel and confined between said cup bearing and the bottom of said channel, said sealing ring having concentric annular bearing portions in sliding contact with the inner end of said cup bearing and an annular channel between the bearing portions for retaining lubricant, said cup bearing having a cup shaped body portion with an inner end portion of reduced diameter and having a bearing ring provided with a circular flange embracing said portion of reduced diameter and an inwardly projecting flange forming an annular bearing face at the inner end of said cup bearing for engagement by annular bearing portions of said sealing ring.

12. In a universal coupling having a yoke provided with an arm spaced laterally from the axis of rotation of the coupling and a cross having a trunnion journaled in said arm, the combination therewith of a sealed bearing for said trunnion comprising a cup bearing attached to said yoke and receiving said trunnion, means on said cross forming an annular channel concentric with said trunnion and receiving the inner end of said cup bearing, said channel forming means including a retaining ring that forms the outer wall of said channel and that has an interior bearing face engaging the periphery of said cup bearing, and an elastic and flexible sealing ring fitting in said channel and confined between said cup bearing and the bottom of said channel, said sealing ring having concentric annular bearing portions in sliding contact with the inner end of said cup bearing and an annular channel between the bearing portions for retaining lubricant, said cup bearing including a cup shaped body and a roller retaining ring at the inner end thereof that provides an external annular bearing face disposed radially inwardly of the inner end of said cup shaped body and engaged by one of the bearing portions of said sealing ring.

References Cited in the file of this patent

UNITED STATES PATENTS

| | | |
|---|---|---|
| 2,209,854 | Slaght | July 30, 1940 |
| 2,209,855 | Slaght | July 30, 1940 |
| 2,456,356 | Aber | Dec. 14, 1948 |
| 2,471,615 | Gladden | May 31, 1949 |